United States Patent
Giannetti et al.

(10) Patent No.: US 11,606,440 B2
(45) Date of Patent: *Mar. 14, 2023

(54) MONITORING AND MANAGING SERVICES IN LEGACY SYSTEMS USING CLOUD NATIVE MONITORING AND MANAGING TOOLS

(71) Applicant: MASTERCARD INTERNATIONAL INCORPORATED, Purchase, NY (US)

(72) Inventors: Fabio Giannetti, Los Gatos, CA (US); Ryan Eschinger, Brooklyn, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/226,886

(22) Filed: Apr. 9, 2021

(65) Prior Publication Data
US 2021/0306431 A1    Sep. 30, 2021

Related U.S. Application Data

(63) Continuation of application No. 16/831,921, filed on Mar. 27, 2020, now Pat. No. 10,979,516.

(51) Int. Cl.
*H04L 67/51* (2022.01)
*G06Q 20/14* (2012.01)
(Continued)

(52) U.S. Cl.
CPC ........... *H04L 67/51* (2022.05); *G06Q 20/145* (2013.01); *H04L 41/5054* (2013.01); *H04L 43/12* (2013.01); *H04L 61/4511* (2022.05)

(58) Field of Classification Search
CPC ..... H04L 67/51; H04L 41/5054; H04L 43/12; H04L 61/4511; H04L 41/0895;
(Continued)

(56) References Cited

U.S. PATENT DOCUMENTS

| | | |
|---|---|---|
| 7,590,988 B2 | 9/2009 | Milligan et al. |
| 8,756,597 B2 | 6/2014 | Srinivasan et al. |

(Continued)

*Primary Examiner* — El Hadji M Sall
(74) *Attorney, Agent, or Firm* — Barta, Jones & Foley, PLLC

(57) ABSTRACT

The disclosure herein describes using a monitoring tool and a management tool from a cloud native system to monitor and manage an application executing on a legacy system. Network addresses of services running in the application on the legacy systems are discovered. Based on the discovered addresses, a probe is configured for execution on the legacy system by a monitoring tool deployed on the legacy system to obtain metrics data associated with the services running on the legacy system, the metrics data representing execution loads of the application. A management tool deployed on the cloud native system receives the obtained metrics data. The management tool compares the metrics data to one or more performance thresholds associated with the application. Based on the comparison, the management tool adjusts a quantity of instances of the application running on the cloud native system, enabling the cloud native system to share the execution loads.

20 Claims, 12 Drawing Sheets

(51) Int. Cl.
  *H04L 41/5054* (2022.01)
  *H04L 43/12* (2022.01)
  *H04L 61/4511* (2022.01)

(58) Field of Classification Search
  CPC ..... H04L 41/40; H04L 43/20; H04L 41/0853; H04L 41/0886; H04L 41/5009; H04L 43/16; H04L 41/0806; H04L 43/08; H04L 67/1031; H04L 67/1036; H04L 67/1008; G06Q 20/145; G06Q 20/10; G06F 2209/508; G06F 9/5083
  See application file for complete search history.

(56) References Cited

U.S. PATENT DOCUMENTS

| | | |
|---|---|---|
| 10,318,320 B1 | 6/2019 | Thomas et al. |
| 2013/0326513 A1 | 12/2013 | Shiomai et al. |
| 2015/0082432 A1 | 3/2015 | Eaton et al. |
| 2016/0094401 A1 | 3/2016 | Anwar et al. |
| 2016/0269482 A1 | 9/2016 | Jamjoom et al. |
| 2016/0373944 A1* | 12/2016 | Jain .................. H04L 65/80 |
| 2017/0019303 A1* | 1/2017 | Swamy ............... H04L 41/0816 |
| 2017/0331605 A1 | 11/2017 | Shani et al. |
| 2018/0287903 A1* | 10/2018 | Joshi ................... H04L 43/062 |
| 2018/0316751 A1 | 11/2018 | Shen et al. |

* cited by examiner

US 11,606,440 B2

MONITORING AND MANAGING SERVICES IN LEGACY SYSTEMS USING CLOUD NATIVE MONITORING AND MANAGING TOOLS

CROSS-REFERENCE TO RELATED APPLICATION(S)

This application is a continuation of U.S. patent application Ser. No. 16/831,921, filed Mar. 27, 2020, entitled "MONITORING AND MANAGING SERVICES IN LEGACY SYSTEMS USING CLOUD NATIVE MONITORING AND MANAGING TOOLS", the entirety of which is hereby incorporated by reference herein.

BACKGROUND

Legacy systems have monitoring tools suitable for monitoring applications running on the legacy systems. However, more and more organizations are transitioning from legacy systems to cloud native systems that are suitable for running cloud-native applications. When organizations transition from legacy systems to cloud native systems, it is difficult to monitor and manage applications which are being transitioned to the cloud native system but still running on the legacy systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for using a monitoring tool and a management tool from a cloud native system to monitor and manage an application executing on a legacy system is described. Network addresses of services running in the application on the legacy system are discovered. A probe, executing on the legacy system, is configured by the monitoring tool to obtain metrics data associated with the services running on the legacy system, the metrics data representing an execution load of the application. The obtained data is received by the management tool. The received metrics data is compared to one or more performance thresholds of the application. Based on the comparison, it is determined by the management tool whether a quantity of instances of the application on the cloud native system should be adjusted. Based on the determination, the quantity of instances of the application is adjusted on the cloud native system to share the execution load between the legacy system and the cloud native system.

BRIEF DESCRIPTION OF THE DRAWINGS

The present description will be better understood from the following detailed description read in the light of the accompanying drawings, that depict examples of operation of the invention; whose brief description is given below.

Corresponding reference characters indicate corresponding parts throughout the drawings. In FIGS. 1 to 7 and 12, the systems are illustrated as block diagrams which may not be to scale.

DETAILED DESCRIPTION

Figure 2:
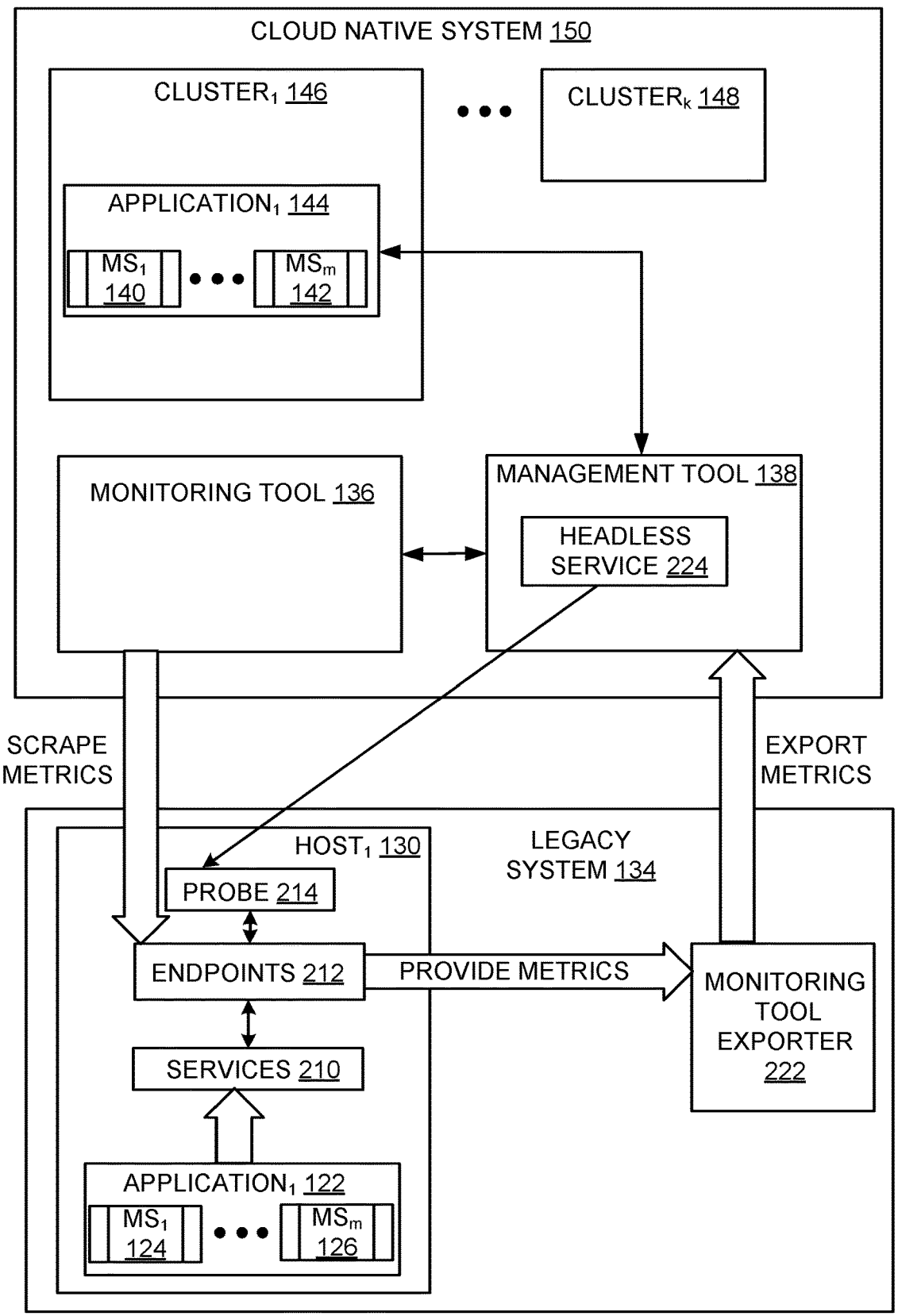
FIG. 2 is a block diagram illustrating the cloud native system and the legacy system with a management tool and a monitoring tool deployed in the cloud native system and a monitoring tool exporter operating in the legacy system.
Figure 3:
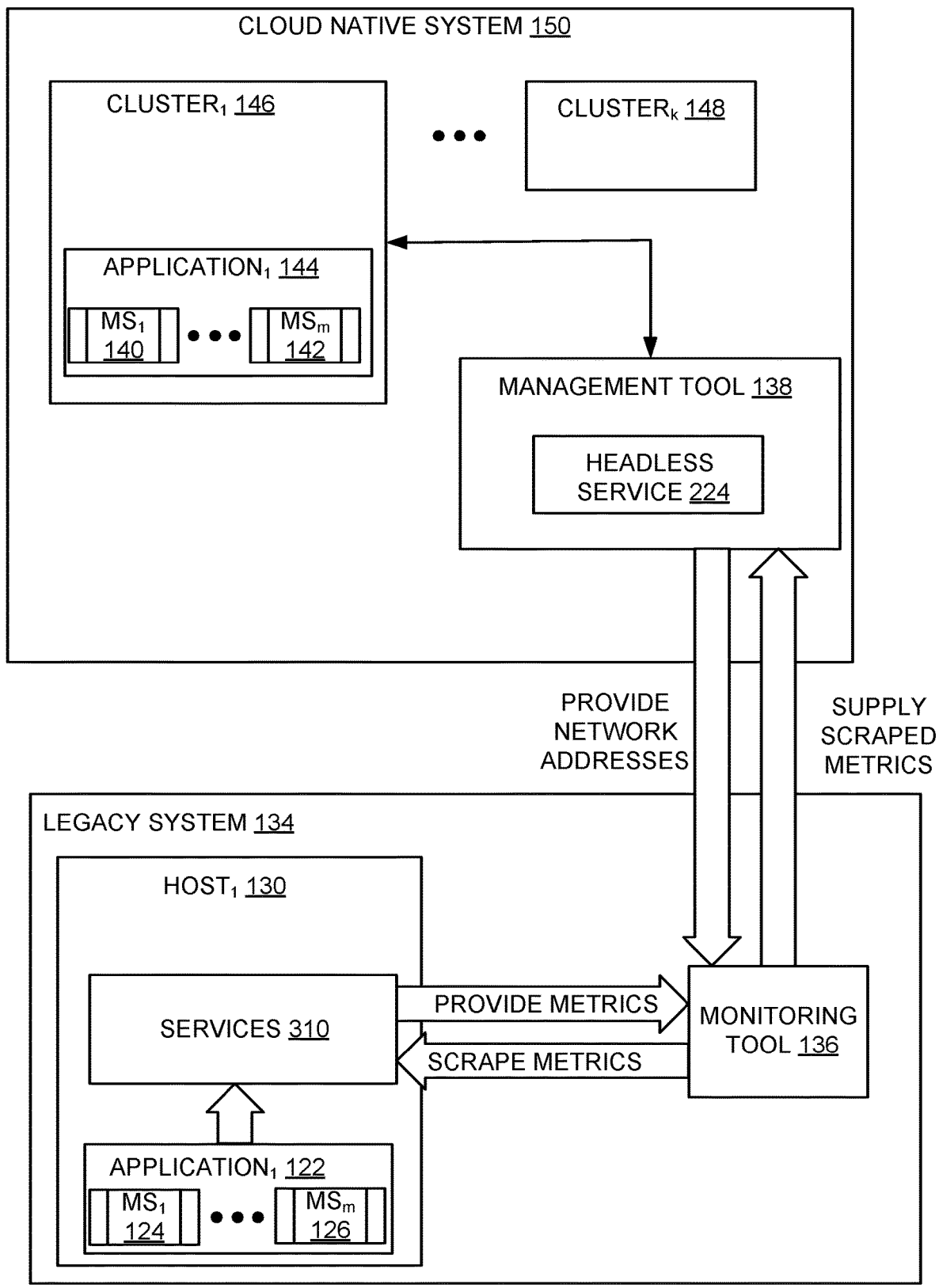
FIG. 3 is a block diagram illustrating the cloud native system and the legacy system with the management tool deployed in the cloud native system and the monitoring tool deployed in the legacy system.

Aspects of the disclosure provide computerized methods and systems for using a monitoring tool and a management tool from a cloud native system to monitor and manage an application executing on a legacy system. In this disclosure 'cloud native system', 'cloud native', and 'cloud native architecture' are used interchangeably. As shown in FIGS. 2 and 3, network addresses (e.g., Internet Protocol (IP) addresses) of various services/endpoints of an application executing on a legacy system are discovered by a monitoring tool that may be deployed on the legacy system or on the cloud native system. Endpoints track the network addresses of the objects to which the service send traffic. The legacy system and the cloud native system may be executing a containerized application that may be partially running on the legacy system and partially on the cloud native system (e.g., one or more instances of the application may be running on the cloud native system). The monitoring tool configures a probe that obtains metrics associated with various services running on the application that is executing on the legacy system. The metrics provide data associated with various functions the application is performing and the traffic the application is handling while performing those functions (e.g., the number of message handled by the application per unit of time or the number of transactions being processed by the application per unit of time while interacting with a customer on an online retailer website and the like). The data associated with the metrics is received by a management tool deployed on the cloud native system. Thus, the received metric data represents, among other things, the execution loads the application is handling while performing various tasks. The management tool on the cloud native system compares the metrics to one or more performance thresholds of the application. The performance thresholds are set based on customer satisfaction levels that the application is expected to meet. Performance thresholds may include, for example, threshold values, counts, quantities, percentages, and the like, such as relating to average response time to a web request, the number of web requests per unit of time that resulted in errors, the proportion of resources (e.g., computing resources, memory resources, disk resources, network resources and other resources) the application is using vis-à-vis the total resources available on the legacy system, and the like. Performance threshold levels may be based on Service Level Agreement (SLA).

Based on the comparison, the management tool is able to make a decision whether a quantity of instances of the application on the cloud native system should be adjusted. If the comparison indicates that there is a shortfall (e.g., within 0.5-4.5 minutes) in the performance of the application (e.g., in meeting an SLA), one or more additional instances of the application are instantiated on the cloud native system to share the execution loads the application is handling. Because any instance running on the cloud native system uses resources available on the cloud native system as needed, an additional instance of the application on the cloud native system uses only as many resources as needed while sharing the execution loads of the application running on the legacy system. At least one advantage of the disclosure is that the disclosure utilizes already existing orchestration and management tools (e.g., Kubernetes) and monitoring tools (e.g., Prometheus) in an unconventional manner to ensure that a containerized application, while executing on a legacy system, continues to perform optimally in the varying execution loads scenarios, without using a disproportionate portion of resources on the legacy system so that other applications running in parallel on the legacy system have their fair share of resources. Hence, the resources available on the legacy system are optimally utilized without requiring additional monitoring and management tools specifically for the legacy system.

Another advantage of the disclosure is that all applications running on the legacy systems are able to derive the benefits of pay per use or subscription models of the cloud native system, thus leading to an overall economy in operations.

The disclosure addresses the challenges of managing containerized applications that are still running on the legacy system, while the organizations using the legacy system are in the process of transitioning to a cloud native system. In this scenario, with the disclosure, no specific managing and monitoring tools are required apart from the ones which are already being used for the cloud native system.

A monolithic application is designed without modularity and it is a single-tiered software application in which the user interface and data access code are combined into a single program. Monolithic applications are suitable for execution on a single platform. In a conventional monolithic application, all the application's components and functions are in a single instance. Containerized applications comprise a number of microservices. A microservice performs a fine-grained function that is a part of the application as a whole. Each of the microservices has a different logical function for the application. The disclosure operates in an unconventional way at least by using the orchestration and management tool and the monitoring tool for a legacy system, while these tools are designed to function on a cloud native architecture for containerized applications. A legacy system may be a conventional virtualized architecture comprising hardware, virtualization infrastructure, hosts, virtual machines, virtualized memory and storage. Hence, the disclosure enables organizations that are in the process of transitioning their applications from legacy systems to cloud native systems to continue to use their existing legacy systems while they have already converted their monolithic applications into containerized applications.

Another advantage of the disclosure is that the metrics collected from the legacy system and those from the cloud native system can be correlated and visualized via a single graphical user interface (GUI), because the same tools are being used to manage both systems. No additional tool is required for correlation, and a single display may be created that monitors the performance of applications running on the two different systems: a legacy system and a cloud native system. A single dashboard may be created that depicts the performance of applications running on the two systems and provide a holistic view of operations occurring on the two systems. If deemed desirable, a system administrator of the organization that is in the process of transitioning applications from a legacy system to a cloud native system can see the dashboard and ensure that the combined system, comprising legacy and cloud native systems, continues to utilize resources optimally and continues to meet the SLA requirements.

Additionally, correlating data between various components of an application is difficult in a legacy system. However, the tools of the cloud native system can tag an application with an application name. Hence, the monitoring tool of the cloud native system (e.g., Prometheus) tracks the components of the application by tagging the application with an application name. All services, the metrics associated with the service/endpoints, and the metrics data are tagged with the application name. All the metrics data with the same application name can be monitored together and acted upon.

Further, the network addresses of the services running on the application are dynamically updated and the adjustment of instances of the application in the cloud native system are dynamically changed to upscale or downscale the instances based on changing execution loads of the application on the legacy system. Hence, it is ensured that the combined system continues to utilize the resources optimally during the entire period of operation of an application. This results in a highly satisfactory user experience.

Figure 1:
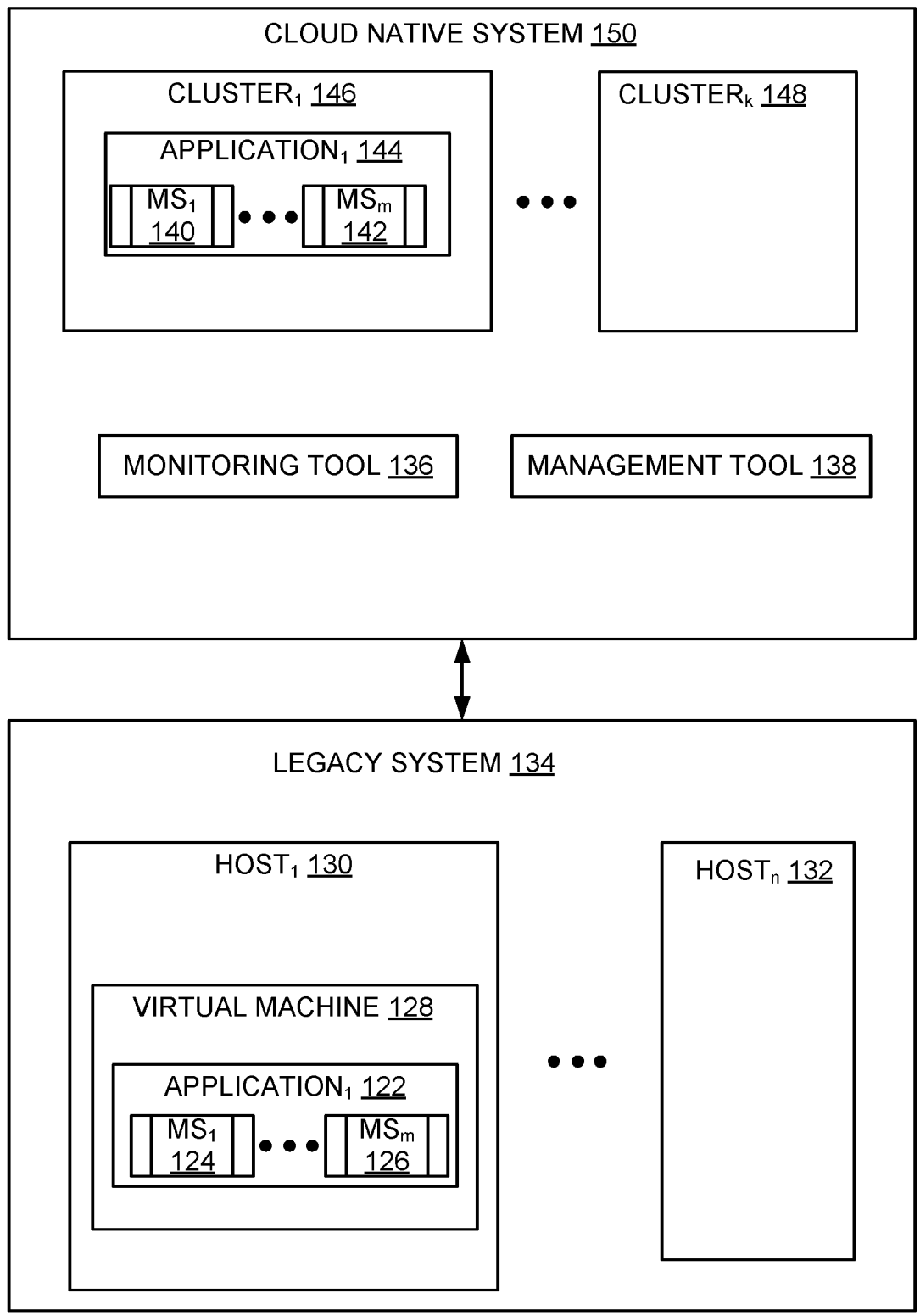
FIG. 1 is a block diagram illustrating a cloud native system and a legacy system together running a containerized application.

FIG. 1 is a block diagram illustrating an example of a cloud native system 150 working in concert with a legacy system 134. The legacy system 134 is a conventional virtualized system comprising a plurality of hosts shown as host$_1$ 130 to host$_n$ 132. Each host hosts one or more virtual machines, though only virtual machine 128 is shown for simplicity. One or more applications may be executing on each virtual machine. For simplicity an application$_1$ 122 is depicted as executing on the virtual machine 128. For simplicity, in subsequent figures, the virtual machine is not shown. The application may be a containerized application comprising a plurality of microservices depicted as MS$_1$ 124 to MS$_m$ 126. A simplified block diagram of the cloud native system 150 is also shown. Cloud native system 150 comprises a plurality of clusters shown as cluster$_1$ 146 to cluster$_k$ 148. Each cluster runs one or more instances of the application running in the legacy system, application$_1$ 144 being shown as one such instance. Other components required to facilitate running an instance of the application$_1$ 144 are not shown for simplicity. Application$_1$ 144 comprises a plurality of microservices MS$_1$ 140 to MS$_m$ 142. A monitoring tool 136 (e.g., Prometheus) and a management tool 138 (e.g., Kubernetes) are also deployed on the cloud native system 150.

FIG. 2 schematically illustrates an example of utilizing the cloud native monitoring tool 136 and management tool 138 for obtaining data associated with services 210 which are associated with the application$_1$ 122 executing on the legacy system 134. The services may be related to a plurality of service objects such as a database object, a message queue object (e.g., a transaction message queue), a webservice object, a user interface (UI) object and the like. Each service object has a label derived from the label of the application$_1$ 122. Each end point 212 has a network address. A built-in management tool controller (e.g., controller 750 shown in FIG. 7) performs the function of assigning network addresses and ports to the services 210 and associated endpoints 212. A domain name service (DNS) on the management tool 138 runs an application programming interface (API) to obtain the network addresses (e.g., IP addresses) of the services 210 and/or endpoints 212. Additionally, or alternatively, a command can be run on the management tool 138 to obtain the network addresses of all services 210 and/or endpoints 212 for example, by using Kubernetes commands. Exemplary code for the commands is as follows:

```
$ kubectl-n default get services kubernetes
metadata:
name: type cluster-ip external-ip port(s) age
$ kubectl-n default get endpoints kubernetes
metadata:
name: endpoints age
```

The code returns the network addresses (e.g., IP addresses) of all endpoints 212 and services 210 running on the legacy system.

Services 210 create mappings between the labels of service objects and corresponding endpoints 212. A headless service 224 (e.g., control-plane-prometheus-node-exporter) is defined in the management tool 138 that provides a probe 214 on the legacy system configured to copy all endpoints 212 associated with the services 210 and their network addresses. A command can be run that periodically checks and determines the changes in the network addresses of all the services 210 and/or endpoints 212. The headless service is then updated based on the changes in the network addresses. Exemplary code to define the headless service is as follows:

```
appiVersion: v1
kind: Service
metadata:
name: prometheus-node-exporter
labels:
app: legacy-app
spec:
clusterIP: None
ports:
protocol: TCP
port: 1800
name: metrics
```

Exemplary code to map the endpoints 212 associated with the application$_1$ 122 is as follows:

```
apiVersion: V1
kind: Endpoints
metadata:
name: legacy-infra-prometheus-node-exporter
subsets:
addresses:
ip: 117.20.4.2
ip: 117.20.4.3
ip: 117.20.4.4
names: metrics
port: 1800
protocol: TCP
```

As shown in FIG. 2, the monitoring tool 136 now begins scraping (i.e., collecting) all metrics associated with the services 210 and/or endpoints 212 using the network addresses of the services 210 and/or endpoints 212. For example, metrics of the services 210 and/or endpoints 212 can be scraped via a pull command which is run on the monitoring tool 136. The services expose their metrics and the pull command running on the monitoring tool scrapes these metrics based on the IP addresses associated with the services 210 and/or endpoints 212. Further, the changes in the network addresses are dynamically updated as stated above, and metrics associated with the updated network addresses are then collected. The collected metrics, that include their label sets, are provided to the monitoring tool exporter 222. The monitoring tool exporter 222 exports the collected metrics to the management tool 138. The collected metrics may comprise specifics of the application; for example, the number of messages generated per unit of time, and the number of messages consumed per unit of time and the like. If the metrics data indicates that performance of the application$_1$ 122 is approaching its performance threshold, action is taken before a situation arises where the performance of the application$_1$ 122 may go below the performance threshold and may not meet the SLA. If the metrics data indicates that performance of the application$_1$ 122 has passed its performance threshold, action is taken to restore performance back to the performance threshold to meet the SLA.

Because the metrics data is being provided to the management tool 138 on the cloud native system 150, the management tool 138 is in a position to make suitable decisions based on a comparison of the metrics data with the performance thresholds of the application$_1$ 122. Application$_1$ 122 is given a unique label (e.g., an application name), and all instances of application$_1$ 122, its services and service objects are tagged using the unique label given to application$_1$ 122. Accordingly, any instance of the application$_1$ 122, such as the application$_1$ 144, all services and service objects related to the application$_1$ 122 can be identified as relating to the application$_1$ 122.

As shown in FIG. 2, a cluster$_1$ 146 on the cloud native system is running one or more instances of the application$_1$ 122 as application$_1$ 144. The instances may comprise one or more microservices MS$_1$ 140 to MS$_m$ 142, where each microservice may address a specific functionality or service object of the application$_1$ 122. If a comparison of the metrics data received by the management tool 138 with a performance thresholds of the application$_1$ 122 indicates that, given the current execution loads on the application$_1$ 122, the application$_1$ 122 will reach one or more performance thresholds within a short period of time (e.g., 1-5 seconds), the management tool starts one or more instances of the application$_1$ 122 in the cluster$_1$ 146. Starting one or more instances of the application$_1$ 122 may include starting one or more microservices MS$_1$ 140 to MS$_m$ 142 to address the likely shortfall in any specific functionality of the application$_1$ 122 (e.g., a length of a message queue of a plurality of messages increasing beyond the current processing capability of the application$_1$ 122, consumption of computing, memory, storage, network and other resources going beyond the current allocation of these resources to the application$_1$ 122, the number of requests received from a webservice for financial transactions going beyond the current processing limit of the application$_1$ 122, and the like).

Starting another instance of the application$_1$ 122 on the cloud native system causes a sharing of execution loads, being currently processed by the application₁ 122 on the legacy system, by the cloud native system. Because the one or more instances are started on the cloud native system, the one or more instances, such as application₁ 144, utilize just enough resources on the cloud native system that are required to share the execution loads of the application₁ 122. At the same time the application₁ 122 continues to function optimally without the user of the application being aware of the sharing. This leads to a satisfying user experience by the users of the legacy system, even during a period when a transition from the legacy system to the cloud native system is taking place.

Figure 10:
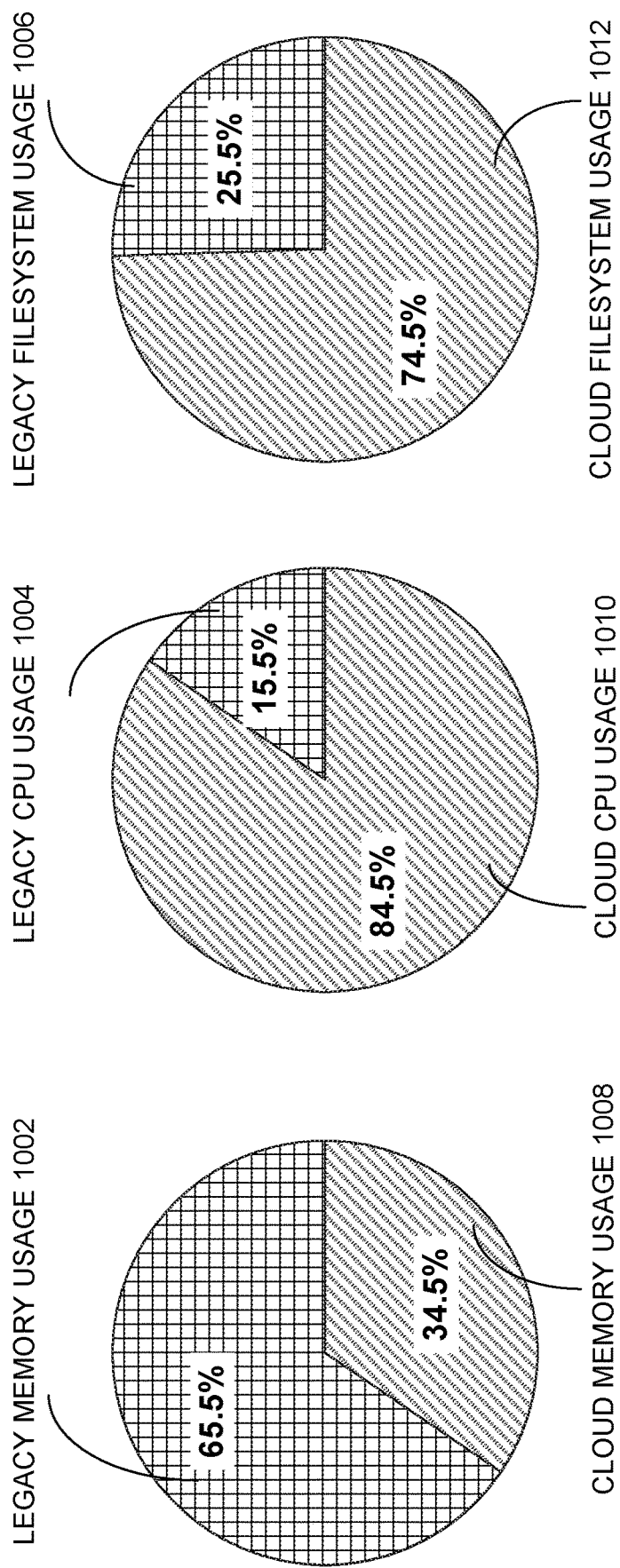
FIG. 10 illustrate some metrics of an application running partially on the cloud native system and partially on the legacy system at a particular moment of time.
Figure 11:
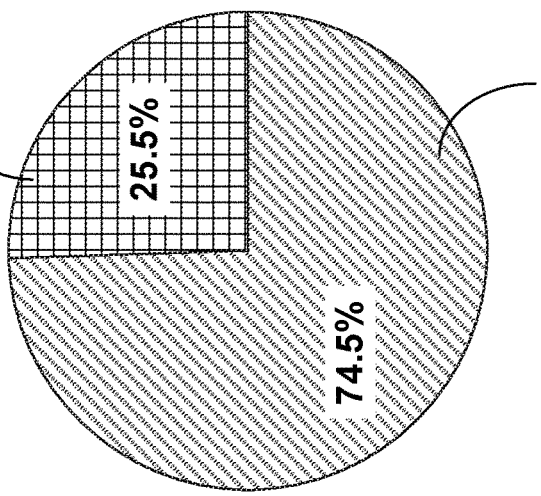
FIG. 11 illustrate the same metrics of the application running partially on the cloud native system and partially on the legacy system at a subsequent moment of time.
Figure 11:
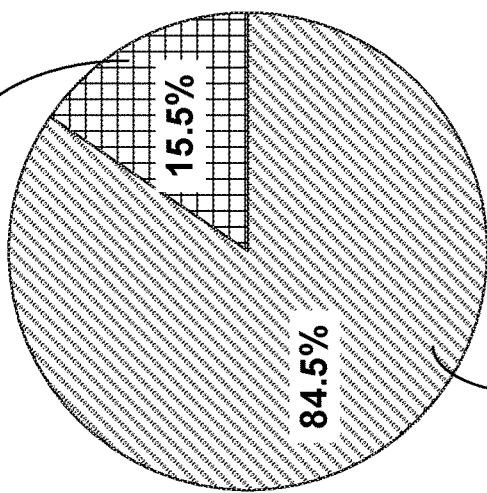
Figure 11:
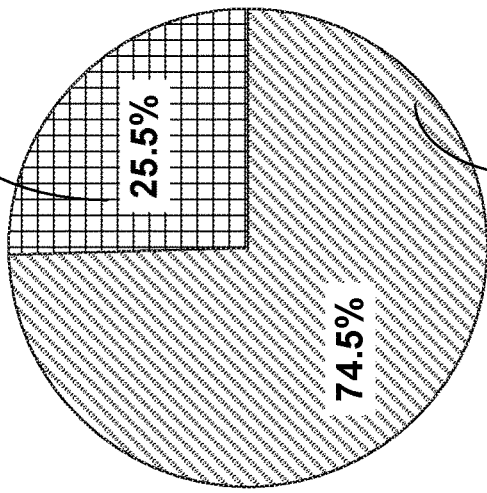

Further, by running the legacy system and cloud native system in concert, and scraping all metrics related to them using the cloud native tools on the cloud native system, a single point for monitoring the services running on the legacy system and the cloud native system is established. A dashboard can be provided either in the legacy system, and/or in the cloud native system that visualizes the performances of both the systems via individual metrics and/or via joint metrics (e.g., as shown in FIGS. 10 and 11). The visualization also lends itself to troubleshooting. An application team can look at the visualization to estimate the points of poor performance, and manually take corrective action if needed.

FIG. 3 illustrates another example of a legacy system and a cloud native system working in concert. In this example, the monitoring tool 136 is deployed on the legacy system 134. A headless service 224 is created in the management tool 138 deployed on the cloud native system 150. This causes the DNS on the management tool 138 to be automatically configured. A DNS query on the headless service is then run that returns the network addresses of all the services 310 running on the application₁ 122. These network addresses (e.g., services IP addresses) are provided to the monitoring tool 136 that then scrapes metrics associated with the services based on the provided network addresses and supplies the scraped metrics to the management tool 138. Thereafter subsequent operations are similar to those described above.

Figure 4:
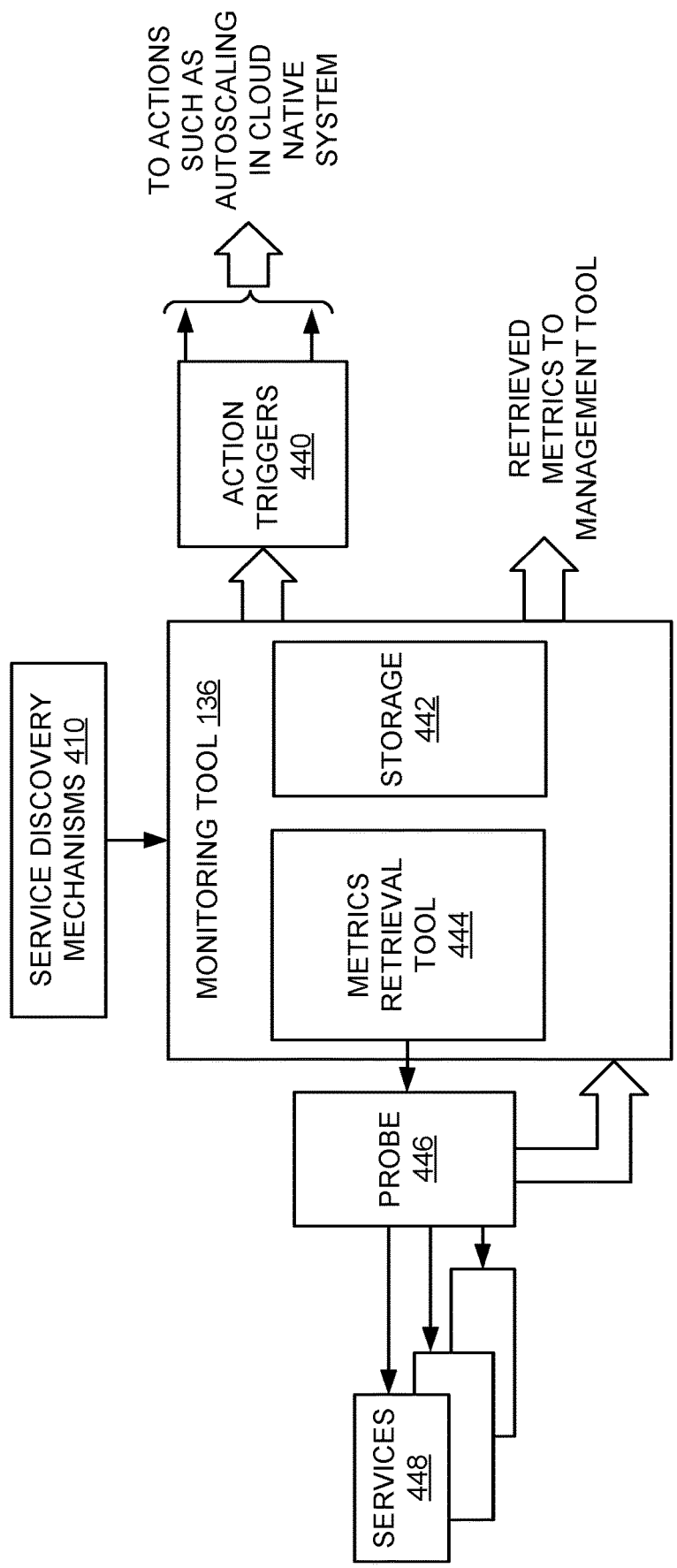
FIG. 4 is a block diagram illustrating the monitoring tool retrieving metrics of the services using a probe.
Figure 5:
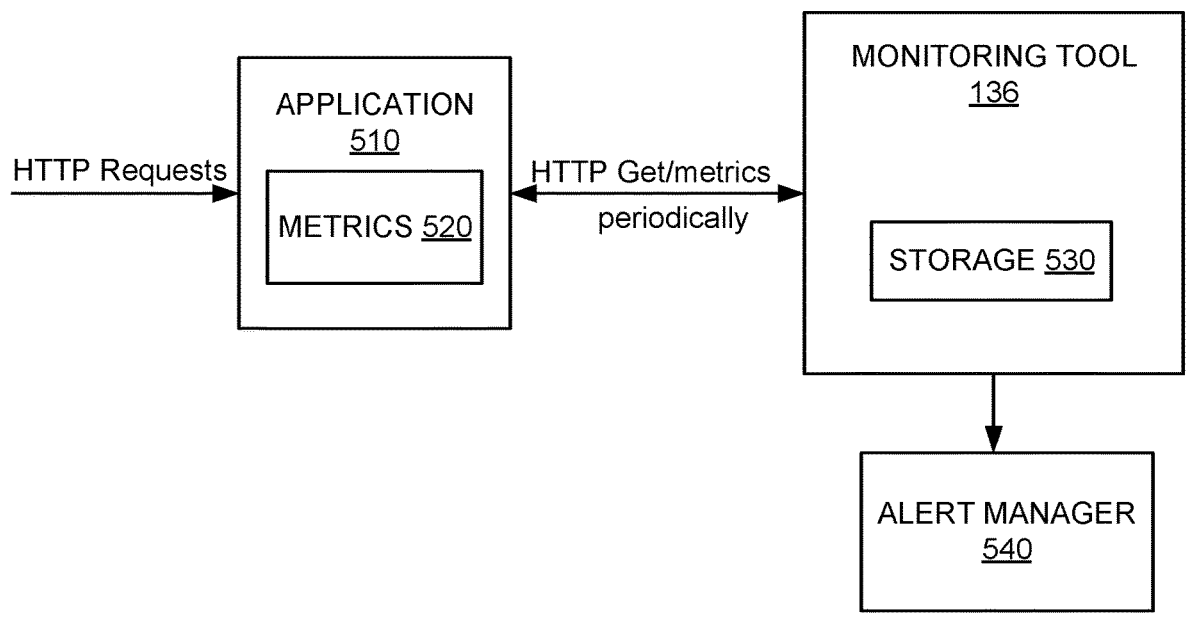
FIG. 5 is a block diagram illustrating the monitoring tool getting metrics periodically.

FIG. 4 illustrates an example of using the service discovery mechanisms 410 available in the management tool 138. As discussed in connection with FIG. 2, a domain name service (DNS) on the management tool 138 can run an API to obtain the network addresses (e.g., IP addresses) of the services 448. For example, in Kubernetes an API server can be queried for IP addresses of the services 448. Additionally, a command can be run on the management tool 138 to obtain the network addresses of all services and/or endpoints for example, by using Kubernetes commands. Furthermore, Consul, which is a service discovery and configuration system, can be used for service discovery. The monitoring tool 136 obtains the network addresses of the services running in the application₁ 122 executing on the legacy system from the service discovery mechanisms 410 and supplies them to a metrics retrieval tool 444. The metrics retrieval tool 444 either obtains the metrics via a pull command or via an intermediary push gateway. The pull command configures a probe 446 to scrape metrics associated with services 448 and provide them to the metrics retrieval tool 444. The push gateway obtains metrics from the services 448 and then pushes them to the metrics retrieval tool 444. In some examples, the push gateway is used for services associated with short-lived objects, in which case the push gateway is used as a buffer to store data relating to short-lived objects, which in turn, pushes it to the metrics retrieval tool 444 at regular intervals. The retrieved metrics are supplied to the management tool 138 for actions as discussed above. In some examples, the retrieved metrics are also supplied to action triggers 440 that automatically trigger an action upon one or more metrics reaching a threshold value. In some examples, the action includes triggering an autoscaling action on the cloud native system by the management tool 138. In one example, the retrieved metrics are stored in storage 442 and periodically supplied to the management tool 138 as time series data FIG. 5 depicts an example of obtaining service metrics of application 510 periodically at suitable intervals (e.g., every 5 minutes, 10 minutes, 15 minutes and so on). Obtaining service metrics periodically is sometimes necessitated by the Hyper Text Transfer Protocol requests (HTTP requests) that the application 510 running on a legacy system 134 may be receiving. Metrics 520 collected by the monitoring tool (e.g., via metrics retrieval tool 444 and/or probe 446) are supplied to an alert manager 540 that can take action upon one or more metrics reaching a threshold value. In some examples, the collected metrics are stored in a storage 530 during an interval as a time series and supplied at the end of each periodic interval to the alert manager 540.

Figure 6:
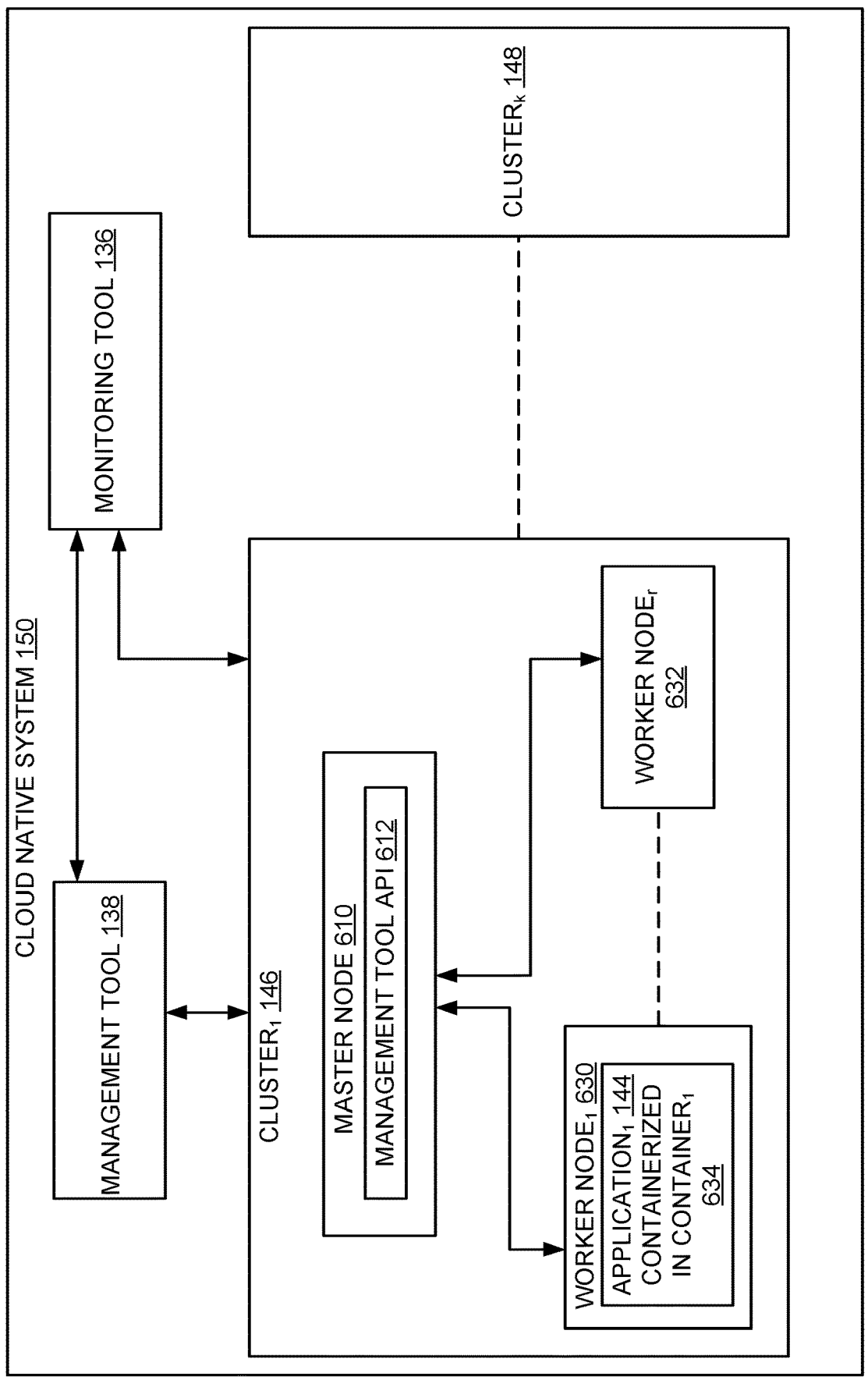
FIG. 6 illustrates a block diagram depicting some details of a cloud native architecture.

FIG. 6 illustrates an example of the cloud native system 150 with the management tool 138 and the monitoring tool 135 deployed therein. The cluster₁ 146 comprises a master node 610 that runs a management tool API 612. The master node 610 interacts with a plurality of worker nodes, such as worker node₁ 630 to worker node_r 632. Each worker node represents a computer host, where the containerized applications are deployed, run, and managed. The application₁ 144 is a cloud native application containerized in a container 634. The master node 610 controls and monitors all resources in the cluster 146. A scheduler decides where to deploy an application taking into account the deployment requirements and available capacity in the cluster 146. The master node 610 exposes the API 612 to the worker nodes 630 to 632, which communicate with the master node 610 via the API 612. Each worker node has tools for managing containers such as container 634. The application₁ 144 and any of the instances of the application₁ 144, required to share the execution loads on the application₁ 122 as described above with respect to FIG. 1, are run within the cluster 146. Thus, management tool 138 can run one or more instances of the application₁ 122 as application₁ 144 to share the execution loads of the application₁ 122 as required.

Figure 7:
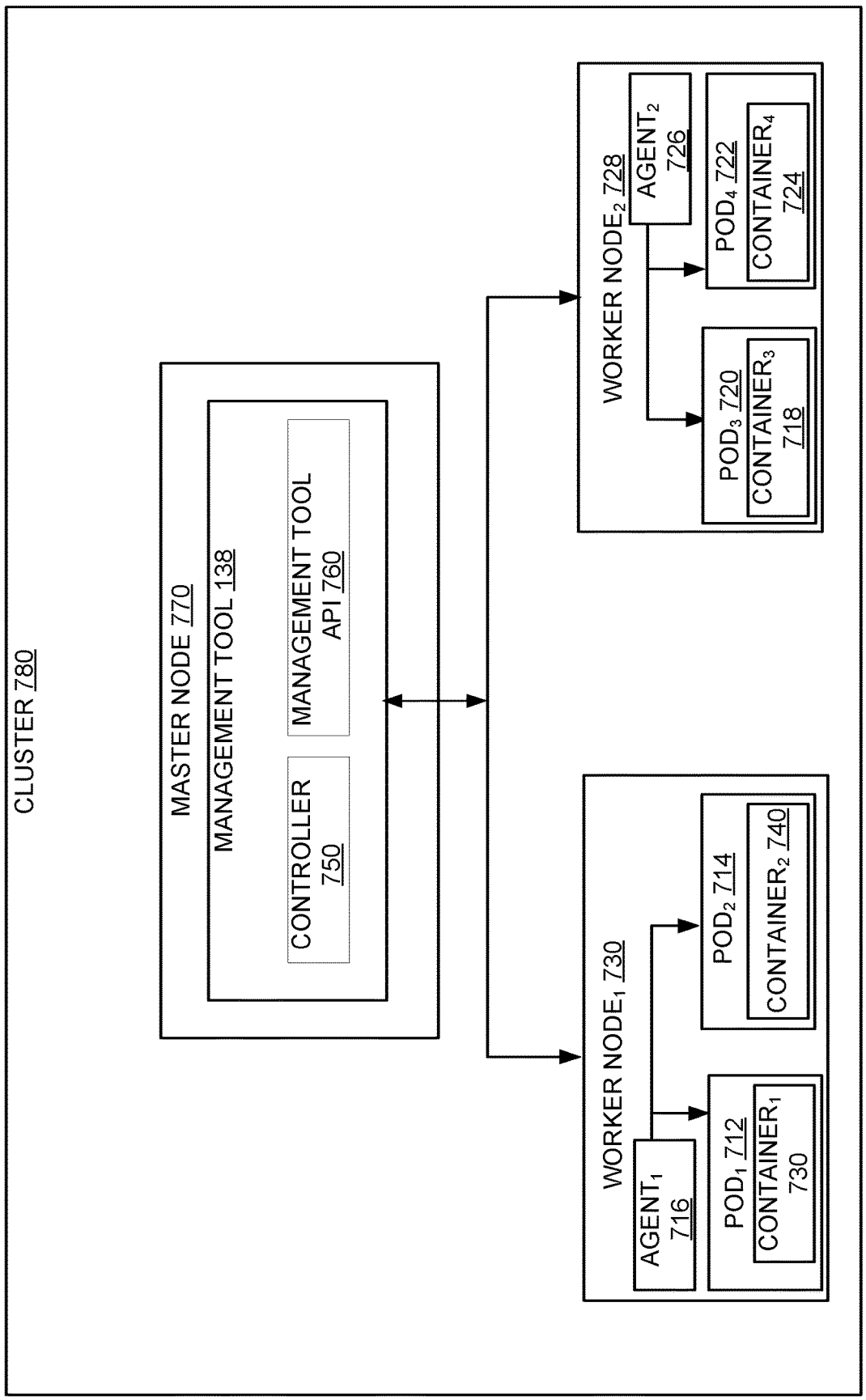
FIG. 7 illustrates a block diagram depicting some details of a cluster in the cloud native architecture.

FIG. 7 illustrates an example of a cluster 780 with additional elements to facilitate running one or more instances of an application executing in the legacy system onto the cloud native system. The cluster 780 has the master node 770 that runs an API 760 and a controller 750 within the management tool 138. Additionally, a worker node₁ 730 and a worker node₂ 728 are controlled by the master node 770. The worker node₁ 730 runs an agent₁ 716 that interacts with a pod₁ 712 and a pod₂ 714. The pod₁ 712 contains a container 730 and the pod₂ 714 contains a container 740. The worker node₂ 728 runs an agent agent₂ 726 that interacts with a pod₃ 720 and a pod₄ 722. The pod₃ 720 contains a container₃ 718 and the pod₄ 722 contains a container₄ 724. A pod represents the smallest deployable unit that is provisioned by the management tool 138. The pods are used to group containers. The controller 750 monitors the application instances and performs other associated functions. When an additional instance of the application₁ 144 is required to be started, a pod containing, for example container₁ 634 as illustrated in FIG. 6, the containerized application₁ 144 is deployed on a worker node that has adequate resources. As discussed earlier, an instance of application₁, 144 shares the execution loads of the application₁ 122 executing on the legacy system. One or more additional instances of application₁ 144 leads to scaling up the application₁ 144. Conversely, when the execution loads on application₁ 122 reduces, instances of application₁ 144 are reduced by terminating one or more pods containing containers that have application₁ 144. This leads to scaling down the application₁ 144. Hence scaling up and scaling down the application₁ 144 in the cloud native system accommodates an increase or a decrease respectively of the execution loads of application₁ 122 executing on the legacy system.

Figure 8:
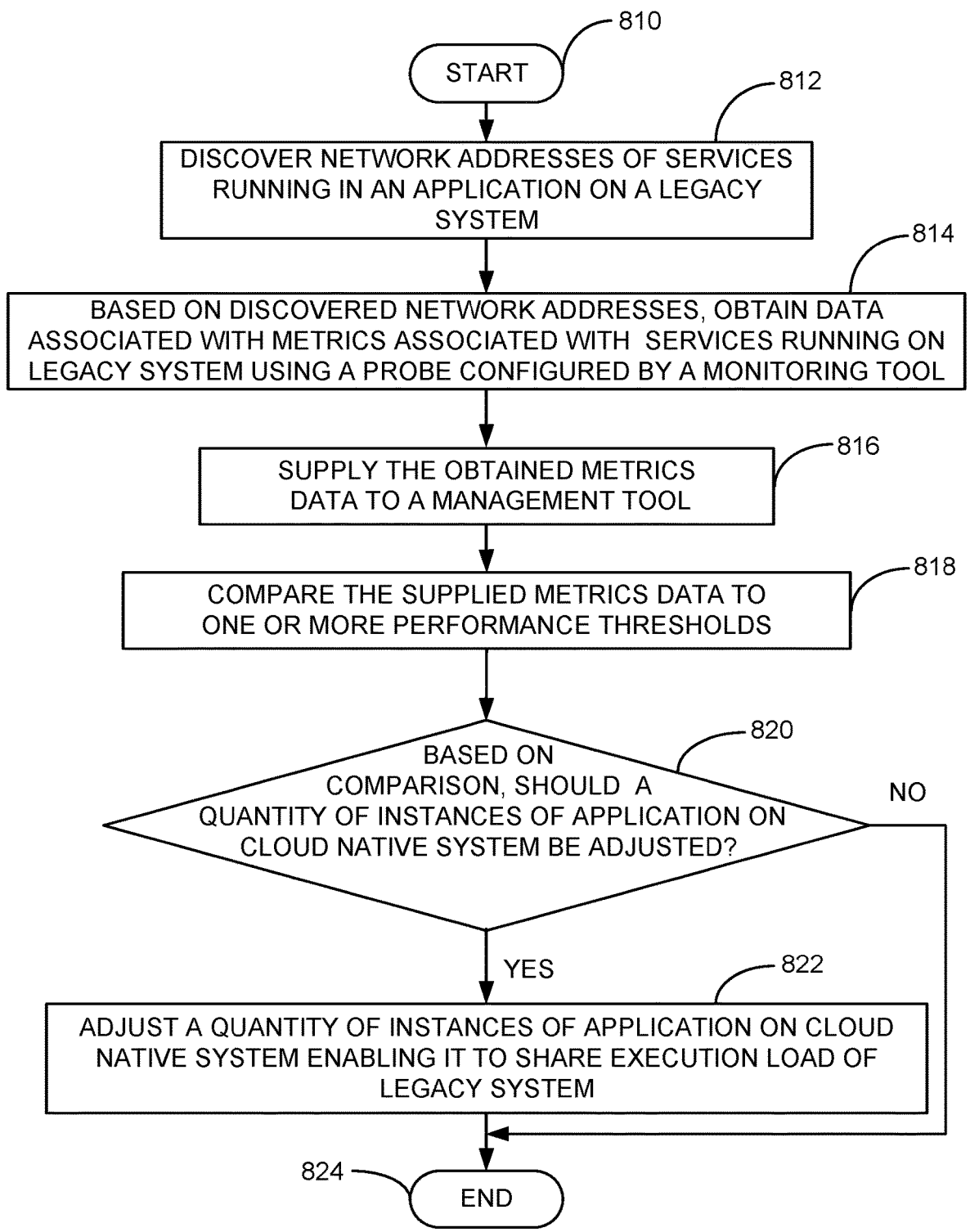
FIG. 8 is a flowchart illustrating a process of adjusting instances of an application based on metrics obtained from the services.

The flowchart shown in FIG. 8 illustrates an example of a process of one or more instances of an application running in a cloud native system sharing execution loads of an application executing on a legacy system. The process begins at 'Start' 810 and, at 812, the network addresses of the services running in an application executing on the legacy system are discovered and obtained. At 814, a probe is configured by a monitoring system running in the cloud native system or the legacy system to obtain metrics data associated with the services running in the application executing on the legacy system based on the discovered network addresses. In some example, the metrics data represents execution loads on the application running in the legacy system. The obtained metrics data is supplied to a management tool running in the cloud native system at 816. At 818, the metrics data is compared to one or more performance thresholds of the application executing on the legacy system. The performance thresholds may include a minimum number of HTTP requests, received from one or more websites, that should be processed per unit of time by the application, a maximum time that can be taken by the application to display data received from a webpage in a GUI, a minimum number of financial transactions associated with a payment card that should be processed by the application per unit of time and the like.

At 820, based on the comparison, it is determined whether a quantity of instances of the application running on the cloud native system should be adjusted. For example, if the comparison shows that the application is approaching one or more of its performance thresholds and it is estimated, based on the current execution load, that the application will reach one or more of its performance thresholds shortly (e.g., in 0.5-4.5 seconds), it may be decided that one or more instances of the application should be started in the cloud native system. If it is decided at 820 that a quantity of the instances of the application running in the cloud native system is required to be increased to share the current execution loads of the application executing in the legacy system, one or more instances of the application are started in the cloud native system at 822. The additional instances of the application in the cloud native system, once started, begin to share the existing execution load of the application executing on the legacy system. Alternatively, if it is determined based on the comparison, and based on the current execution load, that the quantity of the instances of the application running in the cloud native system can be reduced or decreased, one or more instances of the application may be terminated in the cloud native system at 822. However, if it is determined based on the comparison, and based on the current execution load, that there is no need to scale up the quantity of the instances of the application in the cloud native system, the process ends at 824 without any scaling up of the instances of the application in the cloud native system.

Figure 9:
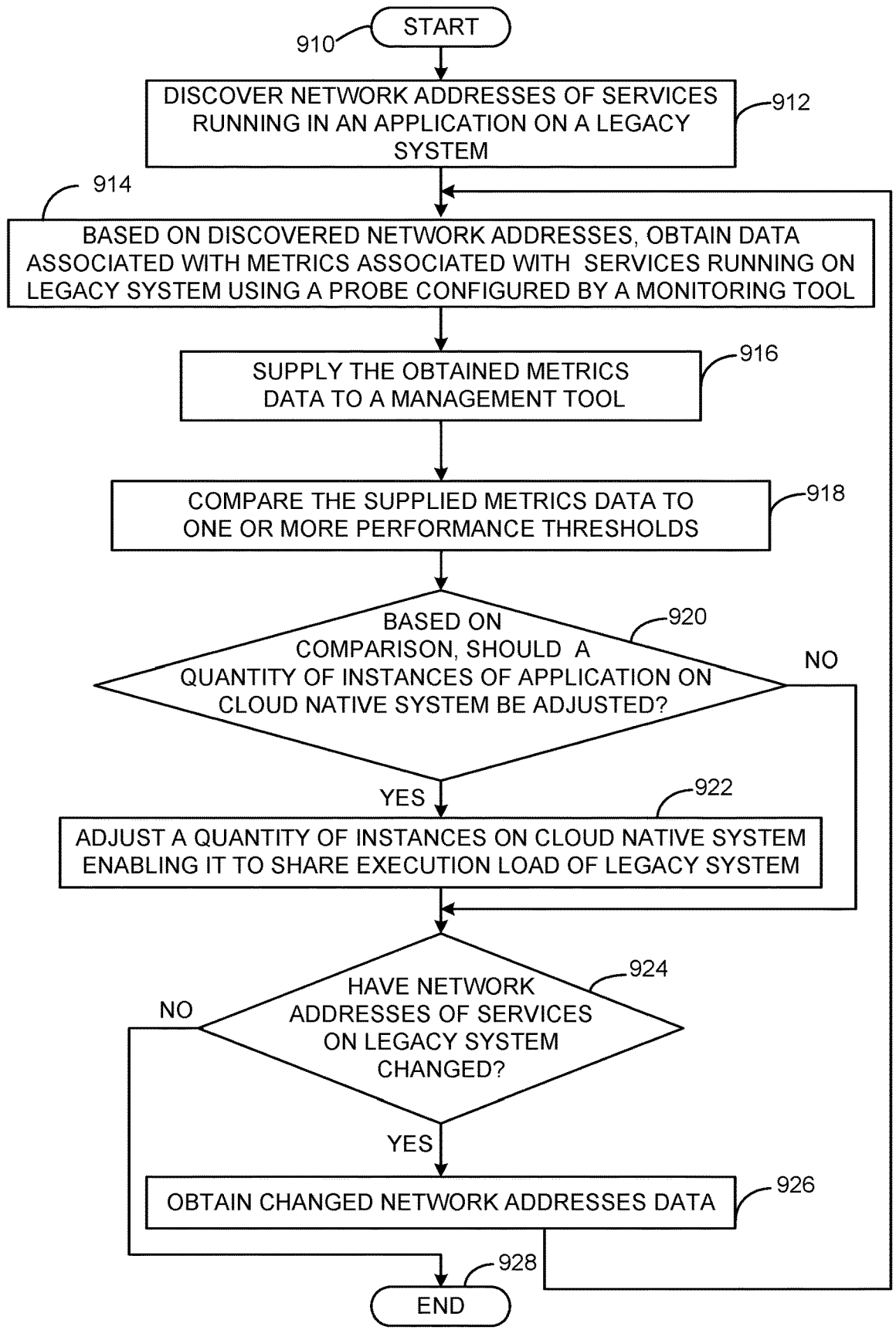
FIG. 9 illustrates a flowchart illustrating a process of updating the metrics and operating based on updated metrics.

The flowchart shown in FIG. 9 illustrates an example of a process of dynamically updating the network addresses of the services running in an application that is executing on a legacy system. The process shown in operations 910-922 are similar to the operations shown at 810-822 in FIG. 8. A discussion of these operations is therefore not repeated here. However, in the flowchart shown in FIG. 9, at 924 it is determined whether the network addresses of the application services that are executing on the legacy system have changed. In some examples this determination is made periodically (e.g., every 5 minutes, 10 minutes, 15 minutes and so on). If at 924 the determination shows that the network addresses of the services running in the application have changed, then at 926 changed network addresses are obtained and the process iterates from operation 914 to operation 924. The process ends at 928 when the network addresses are found to have not changed at 924.

FIG. 10 schematically shows an example of a dashboard of the usage of some of the resources by an application, such as application₁ 122, based on the metrics data collected at a given moment of time. The share of legacy memory in the total memory usage is 65.5% as shown at 1002. Only 34.5% of the total memory is being shared by the cloud native system as shown at 1008. Legacy CPU usage is 15.5% as shown at 1004, while cloud native CPU usage is 84.5%, as shown at 1010, out of the total usage of the CPU. Legacy filesystem usage is 25.5%, while cloud native file system usage is 74.5%, as shown at 1012, out of the total usage of filesystem. Thus, there is a disproportionately high usage of legacy memory by the application₁ 122 at the given moment. The management tool 138 receives this data and it decides to instantiate another instance of application₁ as application₁ 144 on the cloud native system to share the memory load. In one example, starting another instance of application₁ 144 comprises starting one or more of the microservices MS₁ 140 to MS_m 142 so that the share of the memory load by the cloud native system increases as discussed herein.

FIG. 11 illustrates the dashboard of the usage of some of the resources by the application₁ 122, at a subsequent moment, after another instance of application₁ 144 has been instantiated on the cloud native system. As shown at 1102, the share of memory usage by the legacy system has now dropped to 25.5%, while the cloud native system has now started sharing 74.5% of the memory load as shown at 1108. CPU and filesystem shares by legacy system and cloud native system remain unaffected as shown at 1104 and 1110 for CPU, and 1106 and 1112 for the filesystem respectively.
Additional Example Scenarios Aspects of the disclosure enable various additional scenarios, such as next described.

In an example, a Kafka queue on a legacy system comprises a plurality of messages generated by the activities occurring on a website. The number of messages relating to a specific topic and meant to be consumed by a concerned consumer group begins to increase because the consumer group has a fixed allocation of resources on the legacy system to consume the messages related to their specific topic. However, as the monitoring tool that is scraping the metrics data has real time information about the number of the messages relating to that topic, this metrics data can be continually compared to a predetermined threshold by the management tool running on the cloud native system. Before the number of messages reaches this predetermined threshold, another instance of a message handler specific to the Kafka messages queue can be instantiated on the cloud native system to share the load of the consumer group until the consumer group eventually catches up and gets back to handling the data in real time.

In another example, if a parser of a structured query language (SQL) statement on the legacy system becomes slower than a predetermined value, it will affect the entire query processing time. It is possible to have microservices in a containerized application each relating to parsing, optimization, row source generation and execution stages etc. of SQL query processing, running on the legacy system. In this example, a microservice that functions as the parser can be used on the cloud native system. In the above scenario, another instance of the parser microservice can be instantiated on the cloud native system to share the parsing load and increase the overall processing speed of the SQL query.

Exemplary Operating Environment

Figure 12:
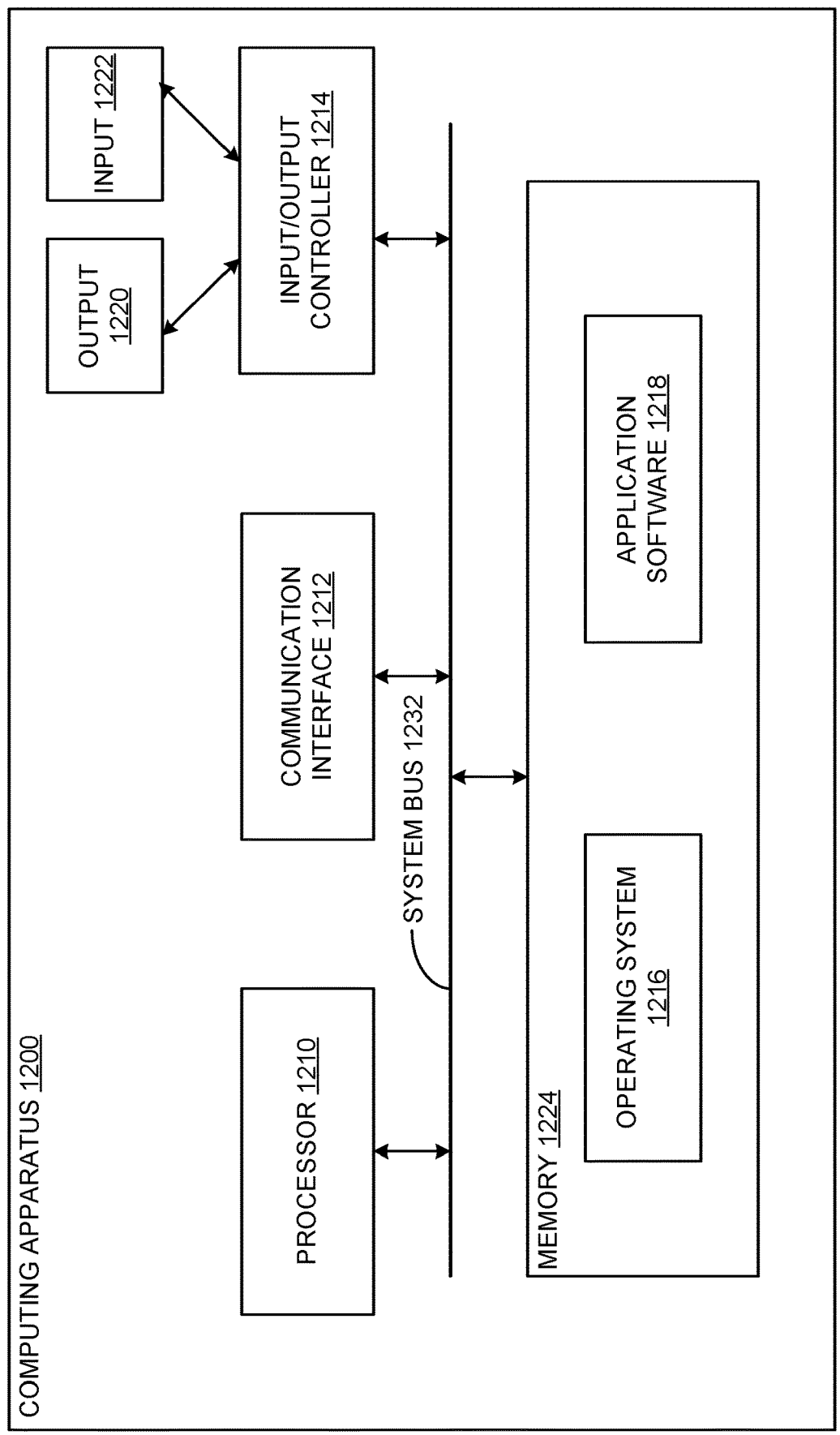
FIG. 12 illustrates a block diagram of a computing apparatus suitable to perform operations and provision systems for this disclosure.

The present disclosure is operable with a computing apparatus according to an embodiment as a functional block diagram shown in FIG. 12. In an example, components of a computing apparatus 1200 may be implemented as a part of an electronic device according to one or more embodiments described in this specification. The computing apparatus 1200 comprises a memory 1224 and one or more processors 1210 and a system bus 1232. The one or more processors 1210 may be microprocessors, controllers or any other suitable type of processors for processing computer executable instructions to control the operation of the electronic device. Alternatively, or in addition, the processor 1210 is any technology capable of executing logic or instructions, such as a hardcoded machine. Platform software comprising an operating system 1216 or any other suitable platform software may be provided on the apparatus 1200 to enable application software 1218 to be executed on the device. According to an embodiment, causing operations to be performed by applications and microservices and other components as described herein may be accomplished by software, hardware, and/or firmware.

Computer executable instructions may be provided using any computer-readable media that are accessible by the computing apparatus 1200. Computer-readable media may include, for example, computer storage media such as a memory 1224 and communications media. Computer storage media, such as a memory 1224, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1224) is shown within the computing apparatus 1200, it will be appreciated by a person skilled in the art, that the storage may be distributed or located remotely and accessed via a network or other communication link (e.g. using a communication interface 1212).

The computing apparatus 1200 may comprise an input/output controller 1214 configured to output information to one or more output devices 1220, for example a display or a speaker, which may be separate from or integral to the electronic device. The input/output controller 1214 may also be configured to receive and process an input from one or more input devices 1222, for example, a keyboard, a microphone or a touchpad. In one embodiment, the output device 1220 may also act as the input device. An example of such a device may be a touch sensitive display. The input/output controller 1214 may also output data to devices other than the output device, e.g. a locally connected printing device. In some embodiments, a user may provide input to the input device(s) 1222 and/or receive output from the output device(s) 1220.

The functionality described herein can be performed, at least in part, by one or more hardware logic components. According to an embodiment, the computing apparatus 1200 is configured by the program code when executed by the processor 1210 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, webservice, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: a monitoring tool; a management tool; at least one processor; and at least one memory comprising computer program code, the at least one memory and the computer program code configured to, with the at least one processor, cause the at least one processor to: discover network addresses of services running in the application on the legacy system; based on the discovered network addresses, configure, by the monitoring tool, a probe for execution on the legacy system to obtain metrics data associated with the services running on the legacy system, the metrics data representing an execution load of the application; receive, by the management tool deployed on a cloud native system, the obtained metrics data; compare the received metrics data to one or more performance thresholds; determine, by the management tool, based on the comparison, whether to adjust a quantity of instances of the application on the cloud native system; and adjust, based on the determination, the quantity of instances of the application on the cloud native system to share the execution load between the legacy system and the cloud native system.

A computerized method for using a monitoring tool and a management tool from a cloud native system to monitor and manage an application executing on a legacy system, the method comprising: discovering network addresses of services running in the application on the legacy system; based on the discovered network addresses, configuring, by the monitoring tool, a probe for execution on the legacy system to obtain metrics data associated with the services running on the legacy system, the metrics data representing an execution load of the application; receiving, by the management tool, the obtained metrics data; comparing the received metrics data to one or more performance thresholds; and adjusting, based on the determination, the quantity of instances of the application on the cloud native system to share the execution load between the legacy system and the cloud native system.

One or more non-transitory computer storage media having computer-executable instructions for monitoring and managing an application executing on a legacy system, upon execution by a processor, cause the processor to at least: discover network addresses of services running in the application on the legacy system; based on the discovered network addresses, configure, by a monitoring tool, a probe for execution on the legacy system to obtain metrics data associated with the services running on the legacy system, the metrics data representing an execution load of the application; receive, by a management tool deployed on a cloud native system, the obtained metrics data; compare the received metrics data to one or more performance thresholds; determine, by the management tool, based on the comparison, whether to adjust a quantity of instances of the application on the cloud native system; and adjust, based on the determination, the quantity of instances of the application on the cloud native system to share the execution load between the legacy system and the cloud native system.

Alternatively, or in addition to the other examples described herein, examples include any combination of the following:

wherein the obtained metrics data includes a length of a message queue of a plurality of messages being processed by the application executing on the legacy system; wherein adjusting a quantity of instances of the application on the cloud native system includes starting at least one instance of the application on the cloud native system to process one or more messages of the plurality of messages of the message queue; wherein a domain name service (DNS) running within the management tool discovers the network addresses of services running in the application on the legacy system; wherein a headless service is defined in the management tool that provides the probe configured to obtain metrics data associated with the services running on the legacy system based on the discovered network addresses; wherein discovering the network addresses includes discovering whether the network addresses have changed over a period of time, and upon determining that the network addresses have changed over the period of time, obtaining metrics data associated with the services based on the changed network addresses; wherein adjusting a quantity of instances of the application on the cloud native system to share the execution load between the legacy system and the cloud native system includes starting at least one instance of the application on the cloud native system and enabling the at least one started instance to use one or more of additional computing resources, memory resources, disk resources, and network resources of the cloud native system to share the execution load; wherein the cloud native system is a pay per use system or a subscription system; wherein the application executing on the legacy system is a containerized application comprising a plurality of microservices; wherein adjusting a quantity of instances of the application on the cloud native system to share the execution load comprises starting a microservice of the plurality of microservices on the cloud native system that performs a functionality of the application executing on the legacy system to at least meet a service level agreement; and wherein the network addresses comprise Internet Protocol (IP) addresses of the services.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for discovering network addresses of services running in the application on a legacy system, based on the discovered network addresses, configuring, by a monitoring tool, a probe for execution on the legacy system to obtain metrics data associated with the services running on the legacy system, the metrics data representing an execution load of the application, receiving, by a management tool, the obtained metrics data, comparing the received metrics data to one or more performance thresholds, determining, by the management tool based on the comparison, whether to adjust a quantity of instances of the application on the cloud native system, and adjusting the quantity of instances of the application on the cloud native system to share the execution load between the legacy system and the cloud native system.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for using a monitoring tool and a management tool from a cloud native system to monitor and manage an application executing on a legacy system, the method comprising:
    discovering network addresses of services running in the application on the legacy system;
    based on the discovered network addresses, obtaining metrics data associated with the services running on the legacy system, the metrics data representing an execution load of the application;
    comparing the obtained metrics data to one or more performance thresholds;
    determining, based on the comparison, whether to adjust a quantity of instances of the application on the cloud native system; and
    based on the determination, automatically triggering an adjustment of the quantity of instances of the application executing on the cloud native system to share the execution load between the legacy system and the cloud native system.

2. The computerized method of claim 1, wherein the obtained metrics data includes a quantity of transactions being processed by the application executing on the legacy system.

3. The computerized method of claim 2, wherein automatically triggering an adjustment of the quantity of instances of the application includes starting at least one instance of the application on the cloud native system to process one or more transactions of the quantity of transactions.

4. The computerized method of claim 1 further comprises:
    monitoring relative usage of resources on the legacy system and the cloud native system via a single graphical user interface (GUI).

5. The computerized method of claim 1 further comprises:
    based on the comparison, determining that performance of the application is reaching at least one performance threshold of the one or more performance thresholds and starting one or more instances of the application executing on the cloud native system before the at least one performance threshold is reached.

6. The computerized method of claim 1 further comprises:
    subsequent to the automatic triggering of the adjustment of the quantity of instances of the application, discovering whether the network addresses have changed over a period of time, and upon determining that the network addresses have changed over the period of time, obtaining metrics data associated with the services based on the changed network addresses.

7. The computerized method of claim 1, wherein automatically triggering an adjustment of the quantity of instances of the application executing on the cloud native system includes starting at least one instance of the application on the cloud native system and enabling the at least one started instance to use one or more of additional computing resources, memory resources, disk resources, and network resources of the cloud native system to share the execution load.

8. The computerized method of claim 1, wherein the automatic triggering of the adjustment of the quantity of instances of the application occurs during transitioning of the application from the legacy system to the cloud native system.

9. A system for monitoring and managing an application executing on a legacy system, the system comprising:
- a monitoring tool;
- a management tool;
- at least one processor; and
- at least one memory comprising computer program code, the at least one memory and the computer program code configured to, with the at least one processor, cause the at least one processor to:
  - discover network addresses of services running in the application on the legacy system;
  - based on the discovered network addresses, obtain metrics data associated with the services running on the legacy system, the metrics data representing an execution load of the application;
  - compare the obtained metrics data to one or more performance thresholds;
  - determine, based on the comparison, whether to adjust a quantity of instances of the application on a cloud native system; and
  - based on the determination, automatically trigger an adjustment of the quantity of instances of the application executing on the cloud native system to share the execution load between the legacy system and the cloud native system.

10. The system of claim 9, wherein the obtained metrics data includes a quantity of transactions being processed by the application executing on the legacy system.

11. The system of claim 10, wherein automatically triggering an adjustment of the quantity of instances of the application includes starting at least one instance of the application on the cloud native system to process one or more transactions of the quantity of transactions.

12. The system of claim 9, wherein the at least one memory and the computer program code are configured to, with the at least one processor, further cause the at least one processor to:
- monitor relative usage of resources on the legacy system and the cloud native system via a single graphical user interface (GUI).

13. The system of claim 9, wherein the at least one memory and the computer program code are configured to, with the at least one processor, further cause the at least one processor to:
- based on the comparison, determine that performance of the application is reaching at least one performance threshold of the one or more performance thresholds and start one or more instances of the application executing on the cloud native system before the at least one performance threshold is reached.

14. The system of claim 9, wherein the at least one memory and the computer program code are configured to, with the at least one processor, further cause the at least one processor to:
- subsequent to the automatic triggering of the adjustment of the quantity of instances of the application, determine whether the network addresses have changed over a period of time, and upon determining that the network addresses have changed over the period of time, obtain metrics data associated with the services based on the changed network addresses.

15. The system of claim 9, wherein automatically triggering an adjustment of the quantity of instances of the application executing on the cloud native system includes starting at least one instance of the application on the cloud native system and enabling the at least one started instance to use one or more of additional computing resources, memory resources, disk resources, and network resources of the cloud native system to share the execution load.

16. The system of claim 9, wherein the automatic triggering of the adjustment of the quantity of instances of the application occurs during transitioning of the application from the legacy system to the cloud native system.

17. One or more non-transitory computer storage media having computer-executable instructions for monitoring and managing an application executing on a legacy system, upon execution by a processor, cause the processor to at least:
- discover network addresses of services running in the application on the legacy system;
- based on the discovered network addresses, obtain metrics data associated with the services running on the legacy system, the metrics data representing an execution load of the application;
- compare the obtained metrics data to one or more performance thresholds;
- determine, based on the comparison, whether to adjust a quantity of instances of the application on a cloud native system; and
- based on the determination, automatically trigger an adjustment of the quantity of instances of the application executing on the cloud native system to share the execution load between the legacy system and the cloud native system.

18. The one or more computer storage media of claim 17, wherein the obtained metrics data includes a quantity of transactions being processed by the application executing on the legacy system.

19. The one or more computer storage media of claim 18, wherein automatically triggering an adjustment of the quantity of instances of the application includes starting at least one instance of the application on the cloud native system to process one or more transactions of the quantity of transactions.

20. The one or more computer storage media of claim 17, wherein the network addresses comprise Internet Protocol (IP) addresses of the services.

* * * * *